Jan. 16, 1968    W. J. BARBIER    3,363,431
TEMPERATURE CONTROL MEANS AND REFRIGERATION SYSTEM THEREFOR
Original Filed July 29, 1964    3 Sheets-Sheet 3

INVENTOR.
WILLIAM J. BARBIER
BY
ATTORNEY,

United States Patent Office 3,363,431
Patented Jan. 16, 1968

3,363,431
TEMPERATURE CONTROL MEANS AND REFRIGERATION SYSTEM THEREFOR
William J. Barbier, Overland, Mo., assignor to Jackes-Evans Manufacturing Company, St. Louis, Mo., a corporation of Missouri
Original application July 29, 1964, Ser. No. 386,002, now Patent No. 3,313,121, dated Apr. 11, 1967. Divided and this application Dec. 5, 1966, Ser. No. 599,136
3 Claims. (Cl. 62—196)

ABSTRACT OF THE DISCLOSURE

A system for controlling temperatures produced by refrigeration and air conditioning systems in which system circulation produced by compressor means passes through a circuit which includes series connected condenser, expansion and evaporator means, the improvement including means for controllably by-passing the system circulation around the condenser means including by-pass valve means and means for controlling and metering flow through the by-pass means in response to the temperature of the condition being cooled.

---

The present invention relates generally to temperature control means and more particularly to temperature control valve means for controlling the temperature of refrigeration, air conditioning or other similar equipment.

This is a divisional application of copending application Ser. No. 386,002, filed July 29, 1964, now Patent No. 3,313,121, dated Apr. 11, 1967 of the same inventor and more particularly covers the embodiment of the device disclosed in FIG. 3 of the drawings.

There are many devices in existence for controlling the temperature and effects of refrigeration and air conditioning equipment, and many of the known controls include valve means and metering means to control the flow of refrigerant in a system. For the most part, however, the known control means are relatively complicated, they require substantial pressures and pressure differentials for their operation, and they are incapable of accurately metering the flow of refrigerant in response to changes in temperature. Instead, the known devices usually control temperature by periodically shutting off or temporarily by-passing the flow of refrigerant. Furthermore, the known control means are relatively incapable of accurately operating on a controlled restricted flow basis and therefore they are unable to maintain as close a control on temperature as the subject device.

These and other disadvantages and shortcomings of known control devices and systems are overcome by the present invention which teaches the construction and operation of novel control means for regulating the operating temperature of refrigeration, air conditioning, cooling and other similar equipment and of novel systems in which the subject control means are employed.

A principal object of the present invention is to provide improved means for controlling refrigeration, air conditioning and other similar equipment.

Another object is to provide means for more accurately maintaining a predetermined temperature condition.

Another object is to provide relatively simple and inexpensive temperature control means for refrigeration and other cooling equipment.

Another object is to provide mutually cooperative control means responsive to the same or to different control conditions.

Another object is to provide means for controlling the temperature of refrigeration and similar equipment without fully turning off or shutting off the flow of coolant in the system.

Another object is to provide a temperature control for refrigeration and other cooling equipment which can be installed on new as well as on existing equipment with a minimum of modification and change.

Another object is to simplify the construction, installation and maintenance of refrigeration equipment and the like.

These and other objects and advantages of the present invention will become apparent after considering the following detailed specification which discloses several preferred embodiments thereof in conjunction with the accompanying drawings, wherein.

Figure 1:
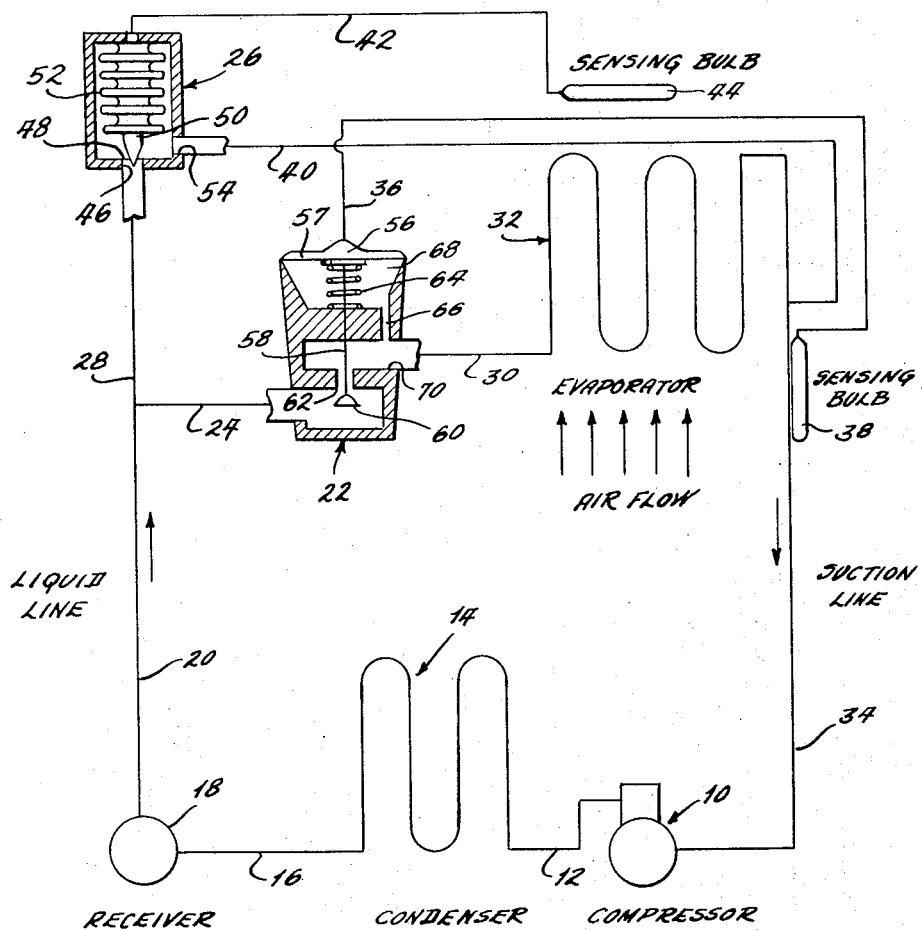
FIG. 1 is a schematic view of a refrigeration or cooling system including temperature control means constructed according to the present invention.
Figure 2:
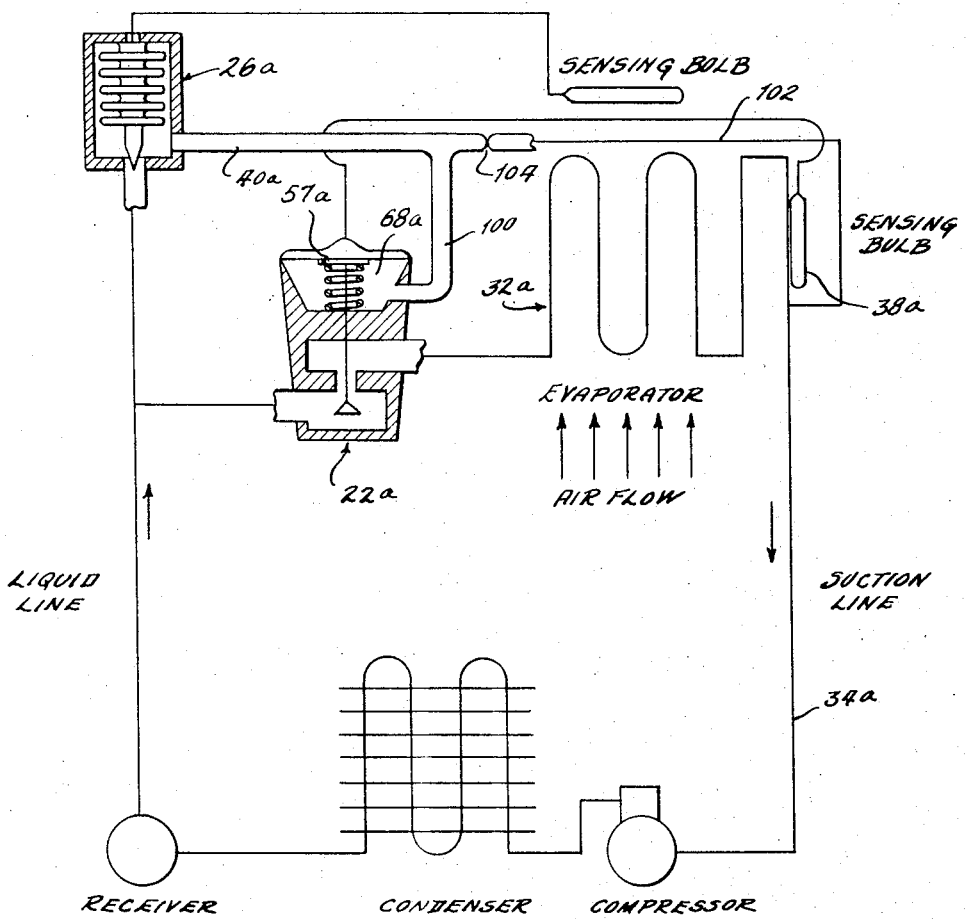
FIG. 2 is a schematic view showing a modified form of system employing control means constructed according to the invention.

The systems disclosed in FIGS. 1 and 2 are described in detail in Barbier Patent No. 3,313,121 of which this is a division. The system disclosed in FIG. 3 of the drawing embodies the teachings of this divisional case.

Figure 3:
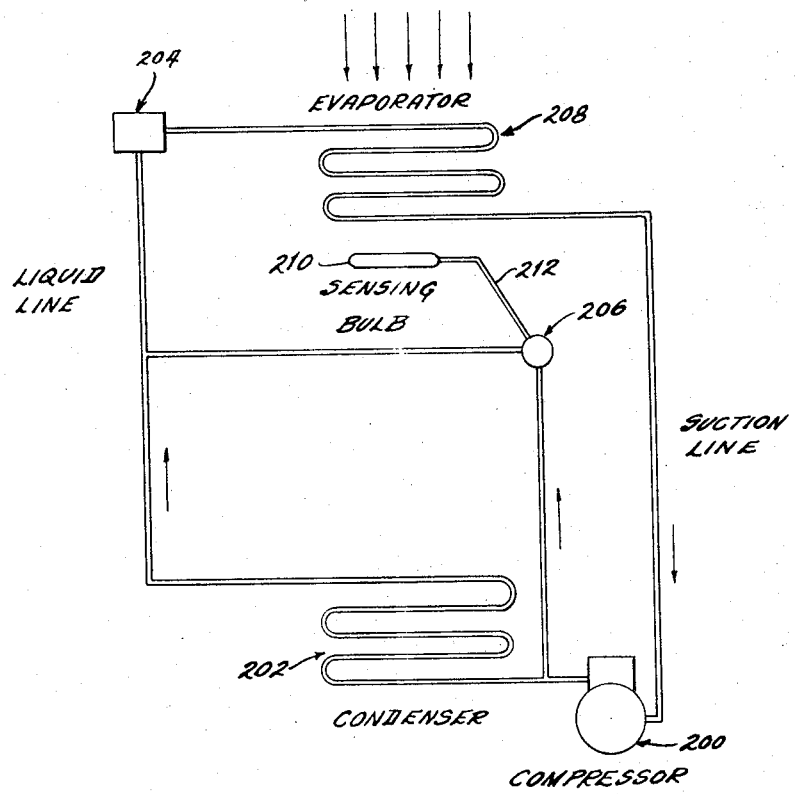
FIG. 3 is a schematic view of another system having temperature control means constructed according to the present invention.

The refrigeration or cooling system disclosed in FIG. 3 includes a compressor 200, a condenser 202, an expansion device 204, a pilot valve 206 and an evaporator 208 connected as shown. In this system, the compressor 200, the condenser 202, the expansion device 204, and the evaporator 208 are connected in a series circuit for producing refrigeration or cooling. The expansion device 204 can be of a construction similar to the valves 22 or 22a of FIGS. 1 and 2 or it can be a constant pressure expansion device or a simple non-controllable restriction type expansion device or any other known expansion device.

The pilot valve 206 in the system of FIG. 3 is connected in a by-pass circuit which is across the condenser rather than across the evaporator. The pilot valve 206 may be of a construction similar to the valves 26 and 26a of FIGS. 1 and 2, respectively, and in like manner, may be controlled by a connection to a temperature sensing element 210 connected thereto by a conduit 212. The element 210 is positioned to respond to the temperature of an environment under control of the evaporator 208. In this case, the pilot valve 206 controls the fluid flow through the condenser 202 from the compressor 200 and it also provides a path for fluid flow directly from the compressor to the evaporator 208. When the temperature of the evaporator environment is reduced below the setting of valve 206, the valve will open allowing the hot discharge gas to by-pass the condenser 202 and enter the liquid line. The heat of the by-passed discharge gas reduces the sub-cooling of the liquid and causes a portion of the liquid flow to change phase into a gaseous form. The greatly increased specific volume of the mixture entering the expansion device reduces the flow of refrigerant through the device. This, in turn, reduces the cooling effect of the evaporator 208.

This system is also reversible. For example, when the evaporator environment increases above the setting of valve 206, the valve will close stopping the by-pass flow of discharge gas around the condenser 202. The refrigerant from the condenser 202 can then flow in the high density liquid phase through the expansion device, obtaining maximum flow through said device, increasing the cooling effect of evaporator 208.

In the modified system of FIG. 3, the expansion valve 204 can be replaced by an expansion device such as an expansion restriction which will flow a lesser amount of refrigerant in gaseous form. Such a device will reduce the output of the evaporator 208 and will increase the temperature affected by the cooling action thereof.

As pointed out above, the operation of all of the disclosd systems are reversible. This is important because it means that the subject control means can control temperature within relatively narrower limits than has been possible heretofore. The present controls and systems can also be used for many different applications including refrigeration and air conditioning where relatively precise and fast acting temperature control is required. The simplicity of the subject control means and systems is also an important factor in making the subject valves and systems relatively economical, easy to install and maintain, and adaptable for use with existing as well as with new equipment.

Thus there has been shown and described novel temperature control means for refrigeration, cooling and other similar equipment, and novel systems including such control means which fulfill all of the objects and advantages sought therefor. Many changes, alterations, modifications and other uses and applications of the subject control means and systems will, however, become apparent to those skilled in the art after considering this specification which discloses several preferred embodiments thereof. All such changes, alterations, modifications and other uses and applications of the subject control means and systems which do not depart from the spirit and scope of the invention are deemed to be covered by the invention which is limited only by the claims which follow.

What is claimed is:

1. Temperature control means comprising a compressor, a condenser, and an evaporator, means connecting the condenser in series with the evaporator across the compressor, and other means by-passing the condenser to meter flow from the compressor to the evaporator, an expansion device connected in series with the evaporator, and a control valve in the by-pass means connected across the condenser, said control valve including a valve chamber with a stationary valve seat and a valve member movable in said chamber relative to said valve seat, and temperature sensitive means including a bulb filled with a fluid that expands and contracts with temperature changes, means connecting said bulb directly to the control valve chamber on one side of the movable valve member to produce pressure changes therein which operate against the movable valve member in a direction to position the movable valve member relative to the stationary valve seat to meter flow through the by-pass valve means in response to the temperature to which the bulb is exposed and to thereby control the amount of compressor output that flows through the condenser.

2. The temperature control means defined in claim 1 wherein said expansion device includes a constant pressure expansion device.

3. The temperature control means defined in claim 1 wherein said expansion device is a non-controllable restriction type expansion device.

References Cited

UNITED STATES PATENTS

| | | | |
|---|---|---|---|
| 2,080,358 | 5/1937 | Kucher | 62—197 |
| 2,344,215 | 3/1944 | Soling | 62—196 |
| 2,403,818 | 7/1946 | McGrath | 62—200 |
| 2,614,394 | 10/1952 | McGrath | 62—199 |
| 2,707,868 | 5/1955 | Goodman | 62—196 |
| 2,987,894 | 6/1961 | Lancaster | 62—196 X |

MEYER PERLIN, *Primary Examiner.*